United States Patent
Boden

[11] 3,861,003
[45] Jan. 21, 1975

[54] CORD LOCKING DEVICE WITH SAFETY LATCH

[76] Inventor: Ogden W. Boden, 1580 Gaywood Dr., Altadena, Calif. 91001

[22] Filed: June 22, 1973

[21] Appl. No.: 372,787

[52] U.S. Cl. ........... 24/136 B, 24/30.5 R, 24/117 R
[51] Int. Cl. ............................................ F16g 11/00
[58] Field of Search ......... 24/136 B, 136 R, 30.5 R, 24/30.5 L, 115 R, 230 CF, 230 SL, 117 R; 403/326, 315

[56] References Cited
UNITED STATES PATENTS

| | | | |
|---|---|---|---|
| 2,200,895 | 5/1940 | Rio | 24/117 R |
| 3,132,390 | 5/1964 | Boden | 24/117 R |
| 3,148,428 | 9/1964 | Koven | 24/230 CF |
| 3,182,516 | 5/1965 | Rapata | 403/326 |
| 3,744,098 | 7/1973 | Bowers | 24/136 R |

*Primary Examiner*—Roy D. Frazier
*Assistant Examiner*—Darrell Marquette
*Attorney, Agent, or Firm*—William P. Green

[57] ABSTRACT

A cord locking device including a body having a passage through which at least one cord extends, and a locking element movable between a locking position for holding the cord or cords against relative longitudinal movement and a retracted position permitting such movement. The device has a safety latch for releasably retaining the locking element in its locking position in a manner preventing unwanted or accidental retraction of the locking element.

9 Claims, 8 Drawing Figures

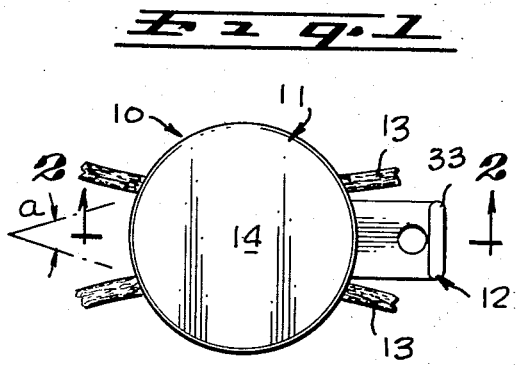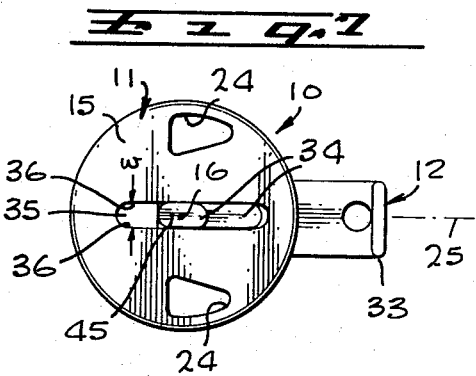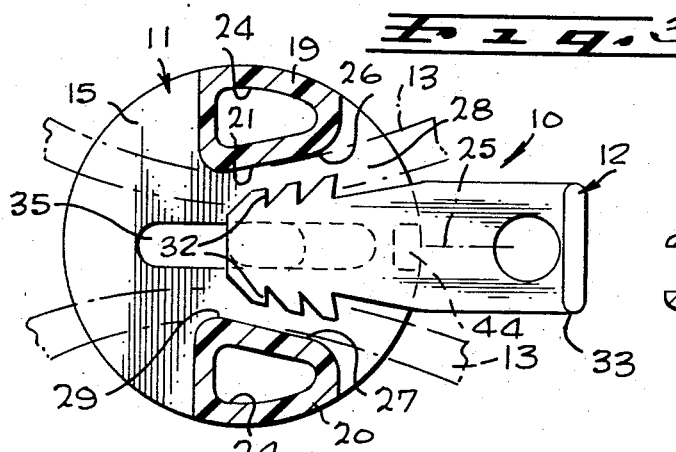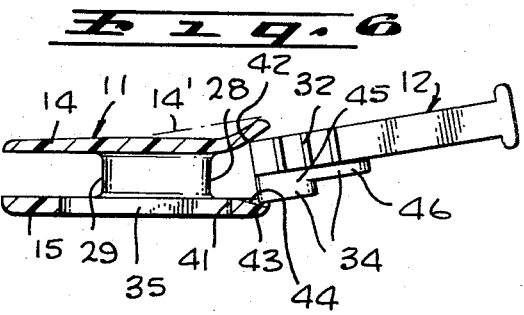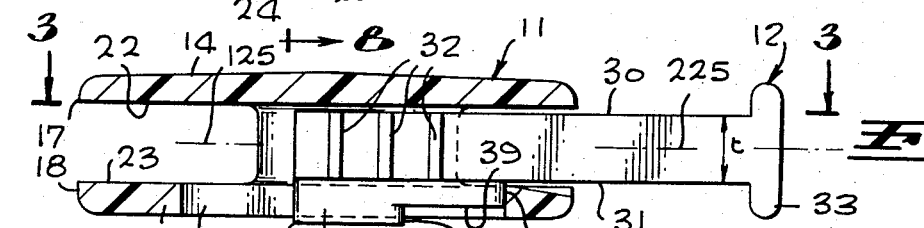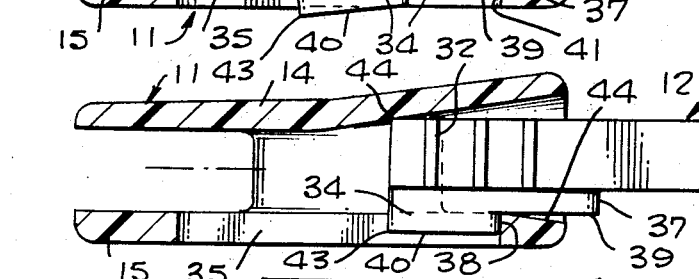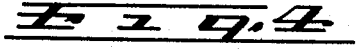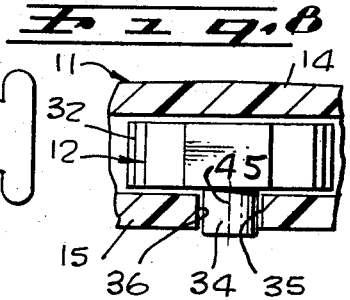

CORD LOCKING DEVICE WITH SAFETY LATCH

BACKGROUND OF THE INVENTION

This invention relates to improved cord locking devices, for retaining a cord or pair of cords in a desired tightened condition. Where a pair of cords are involved, these two cords may either be two entirely separate elements, to be secured together, or the opposite ends of a single cord, such as the drawstring of a garment, bag, or the like. Either situation is intended to be covered by reference in the present application to "two cords."

The general type of device with which the present invention is concerned has been disclosed in my prior U.S. Pat. No. 3,132,390 issued May 12, 1964. The device of that patent includes a body containing a passage through which a cord or pair of cords extend, and containing a locking element movable between a locking position for retaining the cords against longitudinal movement in a predetermined direction, and a retracted position permitting such movement.

SUMMARY OF THE INVENTION

The present invention provides an improvement in the above discussed type of cord locking device, for the purpose of preventing unwanted release of the cord locking action. For instance, if the locking device is being utilized on a child's garment or is otherwise accessible to a child, the unique safety feature of the present invention prevents the child from releasing the locking effect. An adult, however, can easily release the device by a special type of manipulation not readily understandable by the child. Further, the safety latch structure can prevent unintentional or accidental release of the device by an adult.

To achieve these results, the device includes special safety latch means for releasably retaining the movable locking unit against retracting movement from its locking position. Preferably, the locking unit and outer body of the device have coacting shoulders which are engageable in the locking position of the unit to block its retracting movement. These shoulders may, however, be easily shifted relative to one another to a released condition, desirably by a predetermined manual cocking or tilting of the locking unit relative to the body, to a position in which the shoulder on the locking unit can move past the coacting shoulder on the body. The shoulder on the locking unit may be formed on a lug carried by that unit and projecting therefrom into a slot formed in a wall of the outer body. The coacting shoulder on the body may be formed within this slot.

Desirably, an additional shoulder is formed on one of the parts, at a location spaced from the first shoulder on that part to limit retracting movement of the cord locking unit in a second position, after release of the safety latching engagement of the first mentioned shoulders. This additional shoulder is preferably formed on the discussed lug of the locking unit, being stepped outwardly to project farther than the first shoulder in a manner preventing release of the additional shoulder from its engagement with the body even when the locking unit is cocked or tilted to the angle at which it releases the safety latching engagement.

BRIEF DESCRIPTION OF THE DRAWING

The above and other features and objects of the invention will be better understood from the following detailed description of the typical embodiment illustrated in the accompanying drawing, in which:

FIG. 1 is a front view of a cord locking device constructed in accordance with the invention;

FIG. 2 is an enlarged central section in which the body of the device is sectioned on line 2—2 of FIG. 1, and the inner locking unit is shown in elevation;

FIG. 3 is a section taken on line 3—3 of FIG. 2;

FIG. 4 is a view similar to FIG. 2 but showing the locking element as it is being released from its safety latching position;

FIG. 5 is another view similar to FIG. 2, but showing the locking unit in its completely retracted position;

FIG. 6 is a view similar to FIGS. 2, 4 and 5, showing the manner of initial installation of the locking unit or element within the body of the device;

FIG. 7 is a bottom view taken on line 7—7 of FIG. 2; and

FIG. 8 is a fragmentary section taken on line 8—8 of FIG. 2.

DESCRIPTION OF THE PREFERRED EMBODIMENT

The cord locking device 10 illustrated in FIG. 1 includes a body 11, movably containing an inner locking element 12, which in its FIG. 1 locking position acts to retain against longitudinal movement two typically identical flexible cords 13 (which as previously indicated may actually be opposite end portions of a single drawstring or the like). In some uses, only one of the cords 13 of FIG. 3 may be present, with the device then functioning merely to lock that single cord against movement relative to body 11. Body 11 may be of the circular peripheral configuration illustrated in FIG. 1, or may be of any other desired peripheral shape.

As seen in FIG. 2 the body 11 has an upper wall 14 and a lower wall 15 spaced beneath and parallel to top wall 14. These two walls may be essentially flat and disposed transversely of a central vertical axis 16, with the peripheral edges 17 and 18 of the walls being circular about that axis. Two laterally spaced portions 19 and 20 of body 11 (see FIG. 3) extend vertically between and interconnect the two top and bottom walls 14 and 15 to define therewith a passage 21 within which the cords and a portion of the locking element 12 are received. Walls 14 and 15 and portions 19 and 20 may all be molded integrally as a single piece of resinous plastic material, such as polyethylene or polypropylene, having sufficient resilient deformability to function in the manner hereinbelow described. The bottom surface 22 of wall 14 and the top surface 23 of bottom wall 15 of the body 11 of the device may both be planar, and disposed transversely of axis 16.

Portions 19 and 20 may contain lightening recesses 24 extending upwardly thereinto from the bottom of the device (FIGS. 3 and 7) and spaced equal distances from and symmetrical with respect to a central vertical plane 25. The inner surfaces 26 and 27 of portions 19 and 20 may be perpendicular to the planes of transverse surfaces 22 and 23, and converge toward one another progressively and at an angle $a$ as they advance from an entrance end 28 of passage 21 to its exit end 29.

The locking element 12 has parallel planar upper and lower surfaces 30 and 31 which are spaced apart a thickness dimension $t$ just slightly less than the distance between the two surfaces 22 and 23 of top and bottom walls 14 and 15 (FIG. 3). In the FIG. 2 position of the locking element, which is the locked position of that element, surfaces 30 and 31 are received adjacent and confined by surfaces 22 and 23. Element 12 is elongated in a direction extending longitudinally of passage 21, and has at its opposite sides two sets of gripping teeth 32, which in the FIG. 3 position clamp the two cords 13 tightly against the restricted portions of converging surfaces 26 and 27, and are forced into those cords, in a manner effectively preventing the cords from moving longitudinally toward exit end 29 of passage 21 (leftwardly in FIG. 3). Any force exerted on the cords 13 leftwardly in FIG. 3 tends only to pull the locking element 12 more tightly into passage 21, to thus increase the locking effect. Locking element 12 has an outwardly projecting handle portion 33, by which it may be retracted outwardly to the position of FIG. 5, in which position the toothed locking portion 32 of element 12 is withdrawn far enough to leave sufficient open space between teeth 32 and converging passage walls 26 and 27 to allow free longitudinal movement of cords 13 in either direction.

The present invention is particularly concerned with the provision on locking element 12 and body 11 of means for releasably retaining element 12 in the locking position of FIGS. 1 to 3. For this purpose, element 12 has at its underside a lug or projection 34, which projects downwardly beneath the level of planar undersurface 31 of element 12, and which is receivable within an elongated slot 35 formed in bottom wall 15 of the body. This slot 35 is symmetrical with respect to the previously mentioned vertical plane 25, and is elongated parallel to axis 125 of passage 21 (See FIG. 2), which axis is the primary axis of movement of element 12. The slot 35 is defined at its opposite sides by two parallel side edges 36 (FIG. 7) spaced apart a distance w just slightly greater than the width of lug 34, to guide the lug and locking element for inward and outward sliding movement relative to the body. As viewed in plane 25, lug 34 is of the stepped configuration shown in FIG. 2, to form a first planar shoulder 37 perpendicular to bottom surface 21 of element 12, and disposed essentially transversely of the longitudinal axis 225 of element 12, and to form also a second planar shoulder 38 spaced leftwardly of shoulder 37 and projecting downwardly therebeyond. a horizontal surface 39 extends between the two shoulders 37 and 38, and is parallel to the plane of surface 31. A similar underface 40 leftwardly beyond shoulder 38 is also planar and parallel to the plane of surface 31. The right end of slot 36 as seen in FIG. 2 is defined by a vertical surface 41 formed by the body and engageable with and parallel to the shoulders 37 and 38 in the FIGS. 4 and 5 positions of element 12. All of these shoulders 37, 38 and 41, as well as the similar oppositely facing shoulders 137 and 138 at the left end of lug 34 and slot 35, may be planar if desired, but preferably are curved arcuately about a number of individual vertical axes 45, as shown.

In initially assembly the two parts of the device, locking element 12 is first moved to the position shown in FIG. 6 relative to body 11, with an upper end corner 42 of element 12 engaging the undersurface of the rightmost portion of top wall 14 of the body, and with a lower end corner 43 of element 12, and particularly of its lug portion 34, engaging an inclined cam surface 44 formed on the upper peripheral portion of wall 15 of body 11 in alignment with slot 35. Element 12 may be cocked or inclined slightly as is shown in FIG. 6 to engage the top and bottom walls, and may then be forced leftwardly past camming surface 44 until the deepest portion 45 of lug 34 falls into slot 35 in the FIG. 5 position. In order to allow such movement of lug 34 into the slot, the top wall 14 of the body must be deformed upwardly to a substantial extend beyond the position of FIG. 6, (as represented in broken lines at 14'), so that the large lug carrying portion of element 12 can move into the FIG. 5 setting. Even in that position, the top wall is still somewhat deformed, as shown, since the shallower portion 46 of the lug 34 has not yet fallen into the recess. With element 12 thus in its released or retracted position, the two cords 13 at opposite sides of element 12 are free to move longitudinally in either direction, until the user pushes element 12 farther into body 11 and to the locking position of FIGS. 1 to 3. When the locking element 12 reaches this position, the shallower protion 46 of thelug 34 falls into slot 35, as seen in FIG. 2, being pressed downwardly thereinto by the resilience of top wall 14 as soon as shoulder 37 moves beyond shoulder 41. The engagement of these shoulders then retains element 12 in that locking position, in which the cords are prevented from moving longitudinally within the body. Shoulders 37 and 41 thus function together as a safety latch or catch, preventing unwanted release of the lock by a child. If and when it is desired to intentionally release the safety latch, this result may be obtained by forcibly cocking or inclining element 12 relative to body 11 to the FIG. 4 position, with resultant deformation of the rightward peripheral portion of top wall 14 as shown, and against the resistance offered by the stiffness and resilience of that top wall. As soon as this tilting movement has been brought to a point in which shoulder 37 is located upwardly beyond the top portion of shoulder 41, element 12 is free for rightward movement from the FIG. 4 position to the FIG. 5 position, thus releasing the cords for free longitudinal movement within and through the device. The engagement of shoulder 38 with the end surface or shoulder 41 of the slot in the FIG. 5 position limits the retracting movement of element 12, and thereby maintains the two parts of the device in assembled relation. Even if the element 12 is thereafter tilted to an inclination corresponding to that in FIG. 4, this movement cannot release shoulder 38 from its engagement with the end 41 of the slot, and element 12 therefore cannot be readily removed from body 11 by any conveneient manipulation. More specifically, it may be noted that when element 12 is swung from its FIG. 2 position to its FIG. 4 cocked position, the leftmost portion of undersurface 31 of element 12 engages surface 23 at 123 as a fulcrum, causing upward movement of shoulder 37 to its FIG. 4 position for passing shoulder 41. In the FIG. 5 position of element 12, however, undersurface 31 is spaced well above the plane of surface 23, and cannot act as a fulcrum, so that even if element 12 is swung to an angle corresponding to that of FIG. 4, this swinging movement cannot move shoulder 38 upwardly as in FIG. 4 or permit it to pass shoulder 41.

If only one of the two cords of FIG. 3 is present, the device will of course still function in the discussed manner to lock that single cord against longitudinal movement relative to body 11 in the FIG. 2 setting of element 12.

While a certain specific embodiment of the present invention has been disclosed as typical, the invention is of course not limited to this particular form, but rather is applicable broadly to all such variations as fall within the scope of the appended claims.

I claim:

1. A cord lock comprising a body containing a passage through which at least one cord is to extend and having a restricted locking portion; a locking unit located at least partially within said passage and movable between a locking position in which said unit clamps said cord tightly against a wall of the passage, and locks the cord against longitudinal movement toward a predetermined first end of said passage and a retracted position permitting such movement; and means for releasably retaining said locking unit in said locking position relative to said body and against movement to said retracted position; said retaining means including a first shoulder on said locking unit engageable with a coacting second shoulder on said boyd in a relation releasably retaining said locking unit in said locking position relative to the body; there being an additional shoulder formed on said locking unit and spaced from said first mentioned shoulder and engageable with said second shoulder to limit retracting movement of the locking unit in said retracted position thereof; said first shoulder being movable out of engagement with and past said second shoulder by predetermined cocking movement of said unit relative to said body; said additional shoulder projecting outwardly from said locking unit farther than said first shoulder in a relation preventing movement of said additional shoulder out of engagement with and past said second shoulder by cocking movement of said unit relative to said body to the same angularity which releases said first shoulder from said second shoulder.

2. A cord lock comprising a body containing a passage through which at least one cord is to extend and having a restricted locking portion; a locking unit located at least partially within said passage and movable between a locking position in which said unit clamps said cord tightly against a wall of the passage, and locks the cord against longitudinal movement toward a predetermined first end of said passage and a retracted position permitting such movement; and means for releasably retaining said locking unit in said locking position relative to said body and against movement to said retracted position; said body having two generally parallel front and rear walls between which said passage is formed; said retaining means including a lug projecting from said locking unit into a slot formed in a first of said walls and having a shoulder engageable with a shoulder in said slot in a relation retaining said unit in said locking position; the second of said walls being foreably and resiliently deformable away from said first wall by cocking movement of said locking unit and to an extent permitting movement of said shoulder out of engagement with and past shoulder in the slot to release the locking unit to retracted position; said lug having a second shoulder spaced from said first shoulder and engageable with said shoulder in said slot in said retracted position of the locking unit to prevent further retracting movement thereof; said second shoulder being stepped outwardly away from said locking unit farther than said first shoulder to a position preventing movement of said second shoulder out of engagement with said shoulder in the slot by the same deformation of said second wall and the same cocking movement of said locking unit which releases said first shoulder from engagement with said shoulder in the slot.

3. A cord lock comprising a body containing a passage through which at least one cord is to extend; a locking unit located at least partially within said passage and movable therein relative to said body between a locking position in which said unit bears tightly against said cord and holds it against longitudinal movement toward a predetermined first end of said passage, and an unlocked position permitting such movement; first stop means for retaining said unit in said locking position and against retracting movement relative to the body from said locking position to said unlocked position, but releasable to permit said retracting movement; and additional stop means for limiting said retracting movement of the unit in said unlocked position and blocking further retracting movement in a relation maintaining said unit against complete separation from the body, said first stop means including a shoulder on said locking unit engageable with a coacting shoulder on said body in a relation releasably retaining said locking unit in said locking position relative to the body, said additional stop means including an additional shoulder formed on said locking unit and spaced from said first mentioned shoulder and engageable with said second mentioned shoulder to limit retracting movement of the locking unit in said unlocked position thereof.

4. A cord lock as recited in claim 3, in which said body has two generally parallel front and rear walls between which said passage is formed; said first stop means including a lug projecting from said locking unit into a slot formed in a first of said walls and carrying said first mentioned shoulder; the second of said walls being forceably and resiliently deformable away from said first wall by cocking movement of said locking unit and to an extent permitting movement of said first mentioned shoulder out of engagement with and past said second mentioned shoulder in the slot to release the locking unit to unlocked position.

5. A cord lock comprising a body containing a passage through which at least one cord is to extend;

a locking unit located at least partially within said passage and movable therein relative to said body between a locking position in which said unit bears tightly against said cord and holds it against longitudinal movement toward a predetermined first end of said passage, and an unlocked position permitting such movement; first stop means for retaining said unit in said locking position and against retracting movement relative to the body from locking position to said unlocked position, but releasable to permit said retracting movement; and additional stop means for limiting said retracting movement of the unit in said unlocked position and blocking further retracting movement in a relation maintaining said unit against complete separation from the body, said first stop means including lug means projecting from said locking unit into a slot in said body and having a shoulder engageable with an end of said slot to releasably retain said unit in said locking position relative to said body but movable out of engagement with said end of the slot to permit retracting movement of said unit, said additional stop means including a second shoulder on said lug means then engageable with said end of the slot in said unlocked position of said locking unit to prevent further retracting movement thereof.

6. A cord lock comprising a body part containing a passage through which at least one cord is to extend; a locking part located at least partially within said passage and movable therein relative to said body part between a locking position in which said locking part bears tightly against said cord and holds it against longitudinal movement toward a predetermined first end of said passage, and an unlocked position permitting such movement; a first stop shoulder carried by one of said parts and engageable with the other part in a relation retaining said locking part in said locking position and against movement in a retracting direction relative to the body from said locking position to said unlocked position, but releasable to permit retracting movement; and an additional stop shoulder connected to said first shoulder but spaced therefrom longitudinally of the path of movement of said locking part and engageable with said other part in a relation limiting said retracting movement of the locking part in said unlocked position and blocking further retracting movement and thereby maintaining said locking part against complete separation from the body part.

7. A cord lock as recited in claim 6, in which one of said parts is forcibly deformable in a relation enabling movement of said first shoulder relative to said other part to a released position permitting retracting movement of the locking part toward said unlocked position.

8. A cord as recited in claim 6, in which said locking part has a lug received within a slot formed in said body part and carrying said shoulder.

9. A cord lock as recited in claim 6, in which said locking part has a lug received within a slot formed in said body part and carrying said shoulders, said body part being forcibly deformable by said locking part to a position enabling movement a portion of said lug out of said slot and thereby permitting retracting movement of said locking part from said locking position toward said unlocked position.

* * * * *